United States Patent
Weckesser

(10) Patent No.: US 10,526,206 B2
(45) Date of Patent: Jan. 7, 2020

(54) PROCESS FOR OPERATING A FLUIDIZED BED REACTOR

(71) Applicant: Wacker Chemie AG, Munich (DE)

(72) Inventor: Dirk Weckesser, Mehring (DE)

(73) Assignee: WACKER CHEMIE AG, Munich (DE)

(*) Notice: Subject to any disclaimer, the term of this patent is extended or adjusted under 35 U.S.C. 154(b) by 0 days.

(21) Appl. No.: 14/899,143

(22) PCT Filed: Jun. 17, 2014

(86) PCT No.: PCT/EP2014/062661
§ 371 (c)(1),
(2) Date: Dec. 17, 2015

(87) PCT Pub. No.: WO2014/206805
PCT Pub. Date: Dec. 31, 2014

(65) Prior Publication Data
US 2016/0145109 A1    May 26, 2016

(30) Foreign Application Priority Data
Jun. 27, 2013  (DE) .......... 10 2013 212 406

(51) Int. Cl.
*C01B 33/107* (2006.01)
*C01B 33/03* (2006.01)

(52) U.S. Cl.
CPC ....... *C01B 33/10763* (2013.01); *C01B 33/03* (2013.01)

(58) Field of Classification Search
CPC . C01B 33/027; C01B 33/03; C01B 33/10763; C01B 33/10757; C01B 33/1071
USPC ................. 423/341, 342, 348–350
See application file for complete search history.

(56) References Cited

U.S. PATENT DOCUMENTS

| 4,359,490 A | 11/1982 | Lehrer |
| 4,416,913 A | 11/1983 | Ingle et al. |
| 4,786,477 A | 11/1988 | Yoon et al. |
| 6,827,786 B2 | 12/2004 | Lord |
| 2003/0140852 A1 | 7/2003 | Schatzeder et al. |
| 2008/0038178 A1 | 2/2008 | Altmann et al. |
| 2009/0095710 A1* | 4/2009 | Kim ............ C01B 33/027 216/37 |
| 2010/0276002 A1* | 11/2010 | Chen ........... C01B 33/027 136/261 |
| 2013/0156676 A1* | 6/2013 | Katsoulis ....... B01J 23/8926 423/342 |

FOREIGN PATENT DOCUMENTS

| EP | 0 219 142 A2 | 4/1987 |
| EP | 1 886 971 A1 | 2/2008 |
| WO | 2007/145474 A1 | 12/2007 |

* cited by examiner

*Primary Examiner* — Ngoc-Yen Nguyen
(74) *Attorney, Agent, or Firm* — Brooks Kushman P.C.

(57) ABSTRACT

Yield of products of increased purity from a fluidized bed reactor where silicon is produced or consumed is enhanced by purging with inert gas, purging with hydrogen gas, and purging with a chlorosilane-containing gas. The purging with hydrogen is conducted at an elevated temperature.

12 Claims, 1 Drawing Sheet

PROCESS FOR OPERATING A FLUIDIZED BED REACTOR

CROSS REFERENCE TO RELATED APPLICATIONS

This application is the U.S. National Phase of PCT Appln. No. PCT/EP2014/062661 filed Jun. 17, 2014, which claims priority to German Application No. 10 2013 212 406.6 filed Jun. 27, 2013, the disclosures of which are incorporated in their entirety by reference herein.

BACKGROUND OF THE INVENTION

1. Field of the Invention

The invention relates to a process for operating a fluidized bed reactor.

2. Description of the Related Art

Fluidized bed reactors are used, for example, for preparation of trichlorosilane (TCS) by the reaction of metallurgical silicon with HCl at 350-400° C. It is likewise possible to produce TCS in a fluidized bed reactor from metallurgical silicon with STC/$H_2$ (STC=silicon tetrachloride).

Fluidized bed reactors are also used for production of polycrystalline silicon granules. This is accomplished by fluidization of silicon particles by means of a gas flow in a fluidized bed, which is heated to high temperatures by means of a heating apparatus. As a result of addition of a silicon-containing reaction gas, a pyrolysis reaction proceeds at the hot particle surface. This deposits elemental silicon on the silicon particles and the individual particles grow in diameter. Through the regular removal of grown particles and addition of smaller silicon particles as seed particles (called "seed" later in the document), the process can be operated continuously with all the associated advantages. Silicon-containing reactant gases that have been described are silicon-halogen compounds (e.g. chlorosilanes or bromosilanes), monosilane ($SiH_4$), and mixtures of these gases with hydrogen. Deposition processes of this kind and apparatuses therefor are known, for example, from U.S. Pat. No. 4,786,477 A.

In the disassembly and reassembly of a fluidized bed reactor, oxygen and air humidity get into the reactor interior and the necessarily open pipelines via the surrounding atmosphere.

U.S. Pat. No. 8,017,024 B2 discloses a method for producing polycrystalline silicon granules in a fluidized bed reactor. After the deposition has ended, the reactor interior is cooled, while being purged with an inert gas such as $H_2$, $N_2$, Ar, He or a mixture of said gases. Subsequently, the cooled silicon particles are withdrawn, the reactor is disassembled, the reactor tube is replaced by a new one, the reactor is reassembled, and silicon particles are introduced into the reactor tube. Subsequently, the silicon particles are heated and a new deposition operation begins.

U.S. Pat. No. 6,827,786 B2 also describes a fluidized bed reactor. The intention is to recover energy by contacting the granules with gases having a low level of carbon and oxygen impurities.

The problems described gave rise to the objective of the invention.

SUMMARY OF THE INVENTION

These and other objects are achieved by a process for operating a fluidized bed reactor, comprising a purge a of the reactor and the input gas lines with an inert gas; a purge b of the reactor and the input gas lines with $H_2$; and a purge c of the reactor and the input gas lines with a halosilane or with a mixture comprising a halosilane.

DETAILED DESCRIPTION OF THE PREFERRED EMBODIMENTS

Figure 1:
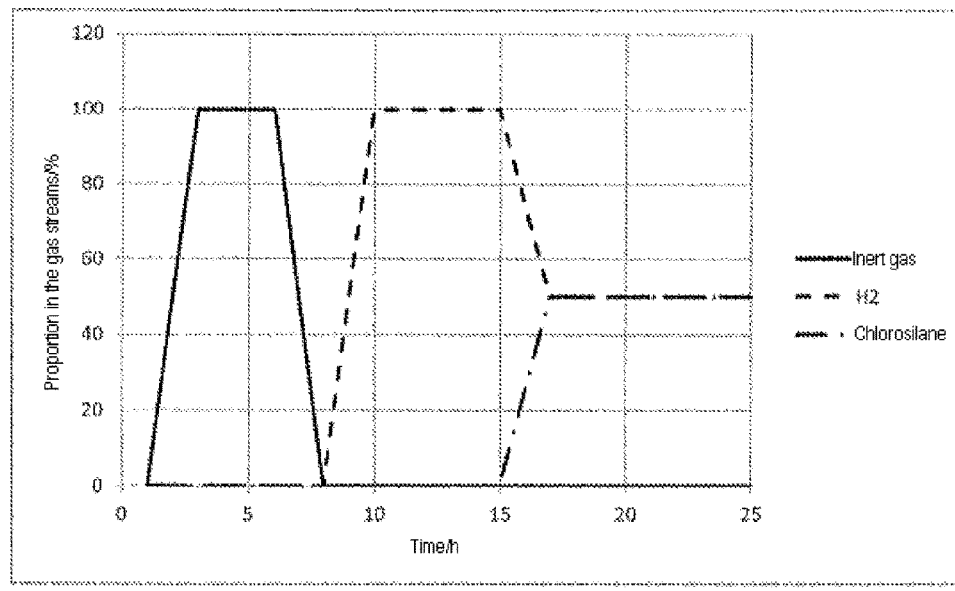
FIG. 1 shows the profile of the proportions of the inert gas, $H_2$ and chlorosilane gas streams against time in the course of startup.

Preferably, purge operations in the sequence a-b-c, i.e. first purging with an inert gas, then purging with $H_2$, then purging with halosilane or a mixture comprising halosilane, are followed by deposition of polycrystalline silicon on seed particles, with a reaction gas comprising halosilane. Preferably, the purging with $H_2$ is concurrent with heating to a temperature of 100-1000° C.

Preferably, the inventive high-purity polycrystalline silicon granules are produced by deposition of a reaction gas on seed crystals of silicon in a fluidized bed.

The reaction gas preferably consists of a mixture of hydrogen and halosilanes, more preferably of a mixture of hydrogen and trichlorosilane.

The deposition is preferably effected at a fluidized bed temperature in the reaction region of 700° C. to 1200° C.

The initially charged seed crystals in the fluidized bed are preferably fluidized with the aid of a silicon-free fluidization gas, preferably hydrogen, and heated by means of thermal radiation. The thermal energy is preferably introduced homogeneously over the circumference of the fluidized bed by means of two-dimensional radiators.

In the reaction zone, the silicon-containing reaction gas is deposited on the silicon particles as elemental silicon because of a CVD reaction. Unreacted reaction gas, fluidization gas and gaseous reaction by-products are removed from the reactor.

By regular removal of particles endowed with the deposited silicon from the fluidized bed and addition of seed crystals, the process can be operated continuously.

The fluidized bed temperature in the reaction region is more preferably from 850° C. to 1100° C., most preferably from 900° C. to 1050° C.

The reaction gas is preferably injected into the fluidized bed via one or more nozzles.

The absolute pressure in the fluidized bed is preferably between 0.1 MPa and 1.1 MPa, more preferably between 0.15 MPa and 0.7 MPa, most preferably between 0.2 MPa and 0.5 MPa.

The concentration of the silicon-containing reaction gas, based on the total gas volume conveyed through the fluidized bed, is preferably 10 mol % to 50 mol %, more preferably 15 mol % to 40 mol %.

The concentration of the silicon-containing reaction gas in the reaction gas nozzle, based on the total gas volume conveyed through the reaction gas nozzle, is preferably from 20 mol % to 50 mol %.

The averaged residence time of the reaction gas in the fluidized bed is preferably 100 ms to 10 s, more preferably 150 ms to 5 s, and most preferably 200 ms to 2 s.

The fluidized bed is preferably operated as a bubble-forming fluidized bed. A slugging mode of operation, in which there is growth of bubbles in the fluidized bed up to the diameter of the fluidized bed, which then push compacted fluidized bed material upward as a solid slug until the bubbles collapse, is preferably avoided through measures such as, for example, the choice of a minimum ratio of bed height to bed diameter (flat bed) or through the arrangement of mechanical bubble breakers in the fluidized bed.

Preferably, a deposition of polycrystalline silicon on seed particles in which a reaction gas comprises halosilane is followed by termination of a supply of reaction gas comprising halosilane and then by the purge operations b-a, i.e. first purging with $H_2$ and subsequently purging with an inert gas, with subsequent opening and disassembly of the reactor.

Preferably, a further purge of the reactor and the input gas lines with an inert gas is effected between disassembly and reassembly of the reactor.

Preferably, one or more of the purges a, b and c is enhanced by pressure swing purging.

Preferably, the inert gas is nitrogen or a noble gas, for example helium or argon.

The invention provides for inertization of the reactor before it is started up with a halosilane/hydrogen mixture. This serves firstly to avoid a hydrogen/oxygen gas explosion; secondly, contamination of the polycrystalline silicon granule product with moisture or the impurities caused by the moisture (e.g. phosphorus from steel) is avoided. It has been found that the inventive purge operations are much more effective than the procedure known from the prior art.

When shutting down the reactor too, it is advantageous to separate the phase in which a halosilane/hydrogen mixture is fed in from the first opening by means of inertization, since reaction gas can otherwise get into the environment.

The purging with inert gas and then hydrogen (when starting up) or hydrogen and then inert gas (when shutting down) thus serves to separate ambient conditions from reaction conditions before and after the deposition.

The halosilane is preferably a chlorosilane. Particular preference is given to the use of trichlorosilane.

The inertization is effected by a purge operation, between the appropriate phases, with an inert gas for a defined time with a defined volume flow rate.

When starting up, purging is first effected with the inert gas and then the reactor is charged with a trichlorosilane/hydrogen mixture.

When shutting down, after the closure of the trichlorosilane/hydrogen feed, purging is first effected with an inert gas and then the reactor is opened.

Particular advantages of the invention are that
an inert state is established with controlled running curves;
there is prevention of any explosive mixture;
product contamination through ingress of moisture is reduced.

A particular advantage is that purging processes with inert gas additionally reduce the contamination by moisture introduced with the seed particles.

In the purge operations, the volume of the pipelines and of the reactor is crucial both for the purge times and for the purge gas volumes. In addition, the desired level of product quality of the silicon granules produced in the later deposition process influences the purge time and the purge gas volumes. In the case of high-purity products for the semiconductor industry, it is accordingly necessary to purge for longer than for solar applications.

Preferred startup procedure:
1. Purge operation a: purging of the reactor and of the input gas lines with an inert gas (N2, Ar, He) for a defined period for removal of $O_2$ and moisture.

The purge operation a is conducted for a period of 0.5 to 10 h.

The gas heaters for fluidization gas and for reaction gas are run here at room temperature. Purging is effected at a purge gas rate of 10 to 500 m$^3$ (STP)/h, the purge gas consisting of 100% inert gas, for example nitrogen.

2. Purge operation b: purging of the reactor and of the input gas lines with H2 for a defined period for removal of the inert gas.

The purge operation b is conducted for a period of 2 to 100 h. The gas heaters are run here at temperatures of 100 to 1000° C. Purging is effected at a purge gas rate of 200 to 1000 m$^3$ (STP)/h, the purge gas consisting of 100% hydrogen.

3. Purge operation c: exchange of H2 for a chlorosilane or a mixture of chlorosilanes in opposite ramps, at constant superficial gas velocity.

The purge operation c is conducted for a period of 2 to 50 h. The purge gas rates are set here such that the following criteria are fulfilled:

The concentration of the silicon-containing reaction gas, based on the total gas volume conveyed through the fluidized bed, is preferably 10 mol % to 50 mol %, more preferably 15 mol % to 40 mol %.

The concentration of the silicon-containing reaction gas in the reaction gas nozzle, based on the total gas volume conveyed through the reaction gas nozzle, is preferably from 20 mol % to 50 mol %.

Consequently, purging is effected with the same gas volumes which are also used for the deposition. The granules deposited in this period are downgraded to offgrade material. The gas heaters are run here at temperatures of 100 to 1000° C. The reactor heater is switched on.

The purging may be continuous or else may be enhanced by pressure swing purging.

Preferred Shutdown Operation:
1. Closure of the chlorosilane feed;
2. Purge operation b: purging of the reactor and of the input gas lines with $H_2$. The purge operation b is conducted for a period of 1 to 20 h. The gas heaters are operated here at temperatures of 100 to 1000° C. Purging is effected at a purge gas rate of 50 to 800 m$^3$ (STP)/h.
3. Inertization of the reactor and of the input gas lines with an inert gas ($N_2$, Ar, He). The purge operation a is conducted for a period of 1 to 20 h. The gas heaters are run at room temperature. Purging is effected at a purge gas rate of 10 to 500 m$^3$ (STP)/h.
4. Opening of the plant and disassembly The purging can also be enhanced by pressure swing purging.

During the change of batch, downtime purging can additionally be effected with an inert gas.

For this purpose, all the pipelines leading to the reactor and leading away from the reactor are purged with an inert gas. The purge gas rate ranges between 1 and 500 m$^3$ (STP)/h at room temperature.

If the reactor is not started up immediately after reassembly, downtime purging is effected in the assembled state. This involves purging all the pipelines leading to the reactor and leading away from the reactor and the reactor itself with inert gas at purge gas rates of 1 to 500 m$^3$ (STP)/h. This measure prevents soiling from forming during the shutdown time. Soiling can arise, for example, as a result of corrosion when the residual compounds outgas from dead spaces or pipe arms. These adversely affect product quality.

The invention is illustrated in detail hereinafter by FIGS. 1 and 2.

FIG. 1 shows that purging is first effected exclusively with an inert gas for a few hours. Then purging is likewise effected only with $H_2$ for a few hours. Thereafter, chlorosilane is added to the $H_2$ gas stream, so as to result in the abovementioned concentrations.

Figure 2:
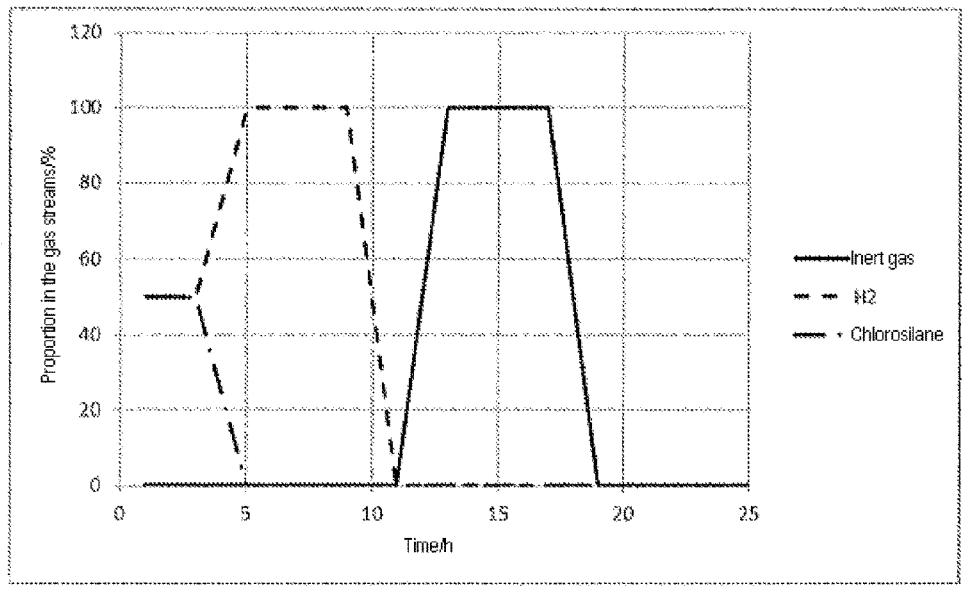
FIG. 2 shows the profile of the proportions of the inert gas, $H_2$ and chlorosilane gas streams against time in the course of rundown.

FIG. 2 shows that the chlorosilane feed is first stopped, the $H_2$ feed is increased and purging is effected exclusively with $H_2$ for a few hours. Thereafter, purging is effected only with an inert gas, likewise for a few hours.

EXAMPLES

A reactor of internal diameter 400 mm is purged in purge operation b for a period of 2 h. The gas rates are 600 m³ (STP)/h; the gas heaters for reaction gas and fluidization gas are set to a temperature of 500° C.

The startup curve for phosphorus and boron dopants is relatively sluggish, such that material of the highest quality having phosphorus contamination of <800 ppta and boron contamination of <50 ppta can be produced only after a reactor run time of 2 weeks. This material is adequate for solar applications, but not for semiconductor applications.

A reactor of internal diameter 400 mm is purged in purge operation b for a period of 30 h. The gas rates are 600 m³ (STP)/h; the gas heaters for reaction gas and fluidization gas are set to a temperature of 100° C. The startup curve for the phosphorus and boron dopants is sluggish, such that material of the highest quality having phosphorus contamination of <800 ppta and boron contamination of <50 ppta can be produced only after a reactor run time of 1.5 weeks. This material is adequate for solar applications, but not for semiconductor applications.

A reactor of internal diameter 400 mm is purged in purge operation b for a period of 30 h. The gas rates are 200 m³ (STP)/h; the gas heaters for reaction gas and fluidization gas are set to a temperature of 500° C. The startup curve for the phosphorus and boron dopants is sluggish, such that material of the highest quality having phosphorus contamination of <800 ppta and boron contamination of <50 ppta can be produced only after a reactor run time of 2 weeks. This material is adequate for solar applications, but not for semiconductor applications.

A reactor of internal diameter 400 mm is purged in purge operation b for a period of 30 h. The gas rates are 600 m³ (STP)/h; the gas heaters for reaction gas and fluidization gas are set to a temperature of 500° C.

After a run time of only 2 days, material of the highest quality for the semiconductor industry is obtained, having phosphorus contamination of <200 ppta and boron contamination of <30 ppta.

The invention claimed is:

1. A process for operating a fluidized bed reactor having input gas lines in an operation for preparing silicon from trichlorosilane, comprising purging the reactor and the input gas lines at room temperature with an inert gas at a gas rate of 10 to 500 m³ (STP)/h for 0.5 to 10 hours in a purge (a); then purging the reactor and the input gas lines with $H_2$ heated by a gas heater operating at 100° C. to 1000° C. for 2 to 100 hours with a gas flow rate of 200 to 1000 m³ (STP)/h in a purge (b); and purging the reactor and the input gas lines with trichlorosilane or with a mixture comprising trichlorosilane heated by a gas heater operating at 100° C. to 1000° C. in a purge (c) for 2 to 50 hours with an amount of purge gas such that a concentration of a trichlorosilane or trichlorosilane mixture based on a total gas rate conveyed through the fluidized bed is 10 mol % to 50 mol % and a concentration of the trichlorosilane or trichlorosilane mixture based on a total gas rate conveyed through a reaction gas nozzle is 20 mol % to 50 mol %, energizing a reactor heater to establish a temperature in the reactor of between 700° C. and 1200° C., adding seed particles and a reaction gas comprising trichlorosilane to the reactor, depositing polycrystalline silicon onto the seed particles to form polycrystalline silicon granules, and recovering polycrystalline silicon granules from the reactor.

2. The process of claim 1, wherein the reaction gas comprises hydrogen and trichlorosilane.

3. The process of claim 1, further comprising, following the deposition of polycrystalline silicon on seed particles, terminating the addition of the reaction gas comprising trichlorosilane, purging the reactor and the input gas lines with $H_2$ heated by a gas heater operating at a temperature of 100-1000° C., wherein the purging is conducted for 1 to 20 hours with a gas rate of 50 to 800 m³ (STP)/h; and then purging the reactor and the input gas lines at room temperature with an inert gas at a gas rate of 10 to 500 m³ (STP)/h for 1 to 20 hours, and then opening and disassembling the reactor.

4. The process of claim 3, wherein the reactor is subsequently reassembled and seed particles are added.

5. The process of claim 4, comprising effecting a further purge of the reactor and the input gas lines with an inert gas between disassembly and reassembly of the reactor.

6. The process of claim 1, wherein one or more of the purges (a), (b) and (c) is/are enhanced by pressure swing purging.

7. The process of claim 1, wherein the inert gas is nitrogen or a noble gas or mixture thereof.

8. The process of claim 1, wherein the reactor heater heats the reactor to a temperature of from 850° C. to 1100° C.

9. The process of claim 1, wherein the reactor heater heats the reactor to a temperature of from 900° C. to 1050° C.

10. The process of claim 1, wherein the flow rate of hydrogen is gradually decreased in purge (b) while simultaneously the trichlorosilane flow rate is gradually increased in purge (c).

11. The process of claim 10, wherein after the decrease in hydrogen flow rate and the increase in trichlorosilane flow rate, the respective flow rates are the same as for subsequent deposition of polycrystalline silicon.

12. The process of claim 1, wherein any polycrystalline silicon granules collected in purge c) are isolated and downgraded to a quality designation of offgrade material.

* * * * *